United States Patent
Zielinski et al.

(10) Patent No.: US 11,021,195 B2
(45) Date of Patent: *Jun. 1, 2021

(54) ACTIVE FRONT DEFLECTOR

(71) Applicant: Magna Exteriors Inc., Concord (CA)

(72) Inventors: Jeffry J. Zielinski, Lake Orion, MI (US); Anthony J. Povinelli, Romeo, MI (US); Martin R. Matthews, Troy, MI (US); Jeffrey B. Manhire, Rochester, MI (US)

(73) Assignee: Magna Exteriors Inc., Concord (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/431,345

(22) Filed: Jun. 4, 2019

(65) Prior Publication Data

US 2019/0283814 A1    Sep. 19, 2019

Related U.S. Application Data

(63) Continuation of application No. 15/928,853, filed on Mar. 22, 2018, now Pat. No. 10,351,182, which is a (Continued)

(51) Int. Cl.
*B62D 35/00* (2006.01)
*B62D 37/02* (2006.01)
*B62D 35/02* (2006.01)

(52) U.S. Cl.
CPC ........... *B62D 35/005* (2013.01); *B62D 35/02* (2013.01); *B62D 37/02* (2013.01); *B60Y 2400/4024* (2013.01); *Y02T 10/82* (2013.01)

(58) Field of Classification Search
CPC ....... B62D 35/005; B62D 35/02; B62D 37/02
(Continued)

(56) References Cited

U.S. PATENT DOCUMENTS 273,978 A    3/1883 Frick
3,913,963 A * 10/1975 Persicke ................ B60R 19/56
                                                       293/15
(Continued)

FOREIGN PATENT DOCUMENTS

DE    2159636 A1    6/1973
DE    2352179 A1    4/1975
(Continued)

OTHER PUBLICATIONS

Galbraith, K.B. et al. "Capstone Design Final Report: Deployable Front Air Deflection System," Dec. 13, 2010.
(Continued)

*Primary Examiner* — Gregory A Blankenship
(74) *Attorney, Agent, or Firm* — Warn Partners, P.C.

(57) ABSTRACT

An active front deflector assembly having a deflector panel, actuator, and linkage assemblies each with a predetermined geometry and ratio of links to each other for movement of the active front deflector assembly between at least a deployed position and a retracted position. The deflector panel is positionable at multiple heights. The assembly deploys and retracts based on vehicle requirements, and, when deployed, redirects the air flow in the front of the vehicle to improve the vehicle aerodynamics for either fuel economy or performance characteristics. Additionally, it allows for the deflector panel to retract so the vehicle meets ground clearances, etc. The deflector panel is also both rigid and semi-rigid to absorb impact energy. A drive shaft transmits the drive from one side to the other side. The deflector is both rigid and semi rigid to absorb impact energy.

19 Claims, 5 Drawing Sheets

Related U.S. Application Data continuation of application No. 15/318,233, filed as application No. PCT/US2015/035127 on Jun. 10, 2015, now Pat. No. 9,956,998.

(60) Provisional application No. 62/010,854, filed on Jun. 11, 2014.

(58) Field of Classification Search
USPC .................................................. 296/180.5
See application file for complete search history.

(56) References Cited

U.S. PATENT DOCUMENTS

| | | | | |
|---|---|---|---|---|
| 4,119,339 A * | 10/1978 | Heimburger | ......... | B62D 35/005 296/180.5 |
| 4,159,140 A * | 6/1979 | Chabot | ......... | B62D 35/005 296/180.5 |
| 4,489,806 A * | 12/1984 | Shimomura | ......... | B62D 35/005 180/313 |
| 4,582,351 A * | 4/1986 | Edwards | ......... | B60R 19/56 293/102 |
| 4,585,262 A * | 4/1986 | Parks | ......... | B62D 35/005 296/180.1 |
| 4,659,130 A * | 4/1987 | Dimora | ......... | B62D 35/005 296/180.1 |
| 4,904,016 A * | 2/1990 | Tatsumi | ......... | B62D 35/005 296/180.5 |
| 4,951,994 A * | 8/1990 | Miwa | ......... | B62D 35/005 296/180.1 |
| 5,485,391 A * | 1/1996 | Lindstrom | ......... | G05B 19/4065 700/175 |
| 5,769,177 A * | 6/1998 | Wickman | ......... | B60L 58/21 180/65.22 |
| 6,070,933 A * | 6/2000 | Tsukidate | ......... | B62D 35/005 296/180.1 |
| 6,079,769 A * | 6/2000 | Fannin | ......... | B62D 35/005 296/180.1 |
| 6,149,544 A * | 11/2000 | Masberg | ......... | B60K 6/26 477/13 |
| 6,184,603 B1 * | 2/2001 | Hamai | ......... | B60K 6/26 310/75 R |
| 6,269,521 B1 * | 8/2001 | Gabel | ......... | E05D 3/145 16/287 |
| 6,286,893 B1 * | 9/2001 | Presley | ......... | B62D 35/005 296/180.5 |
| 6,322,221 B1 * | 11/2001 | van de Loo | ......... | B60R 1/074 359/841 |
| 6,520,557 B2 * | 2/2003 | Benthaus | ......... | E05F 1/1091 296/107.08 |
| 6,598,914 B1 * | 7/2003 | Dixon | ......... | B60K 11/04 293/106 |
| 6,886,883 B2 * | 5/2005 | Jacquemard | ......... | B62D 35/005 296/180.5 |
| 6,932,419 B1 * | 8/2005 | McCullough | ......... | B62D 35/001 296/180.1 |
| 6,942,233 B2 * | 9/2005 | Leitner | ......... | B60R 3/002 105/447 |
| 7,374,299 B2 * | 5/2008 | Brouwer | ......... | B60R 1/074 359/841 |
| 7,387,330 B2 * | 6/2008 | Froeschle | ......... | B62D 35/007 296/180.5 |
| 7,481,482 B2 * | 1/2009 | Grave | ......... | B62D 35/007 296/180.5 |
| 7,775,582 B2 * | 8/2010 | Browne | ......... | B62D 37/02 296/180.1 |
| 7,780,223 B2 * | 8/2010 | Kottenstette | ......... | B62D 35/005 296/180.1 |
| 8,186,746 B2 * | 5/2012 | Mackenzie | ......... | B60R 19/40 296/180.5 |
| 8,366,284 B2 * | 2/2013 | Flynn | ......... | B60R 1/076 359/841 |
| 8,702,152 B1 * | 4/2014 | Platto | ......... | B62D 37/02 296/180.1 |
| 8,887,845 B2 * | 11/2014 | McDonald | ......... | B62D 35/005 180/68.1 |
| 9,021,801 B2 * | 5/2015 | Gao | ......... | F01P 7/10 60/528 |
| 9,039,068 B2 * | 5/2015 | Niemi | ......... | B62D 35/02 296/180.1 |
| 9,150,261 B2 * | 10/2015 | DeAngelis | ......... | B62D 35/02 |
| 9,950,754 B2 * | 4/2018 | Povinelli | ......... | B62D 35/02 |
| 9,956,998 B2 * | 5/2018 | Zielinski | ......... | B62D 35/02 |
| 10,124,839 B2 * | 11/2018 | Povinelli | ......... | B62D 35/005 |
| 10,300,966 B2 * | 5/2019 | Cha | ......... | B62D 35/007 |
| 10,351,182 B2 * | 7/2019 | Zielinski | ......... | B62D 35/005 |
| 2005/0161577 A1 * | 7/2005 | French | ......... | H02K 5/00 248/672 |
| 2006/0081800 A1 * | 4/2006 | Riester | ......... | H02K 7/14 251/129.01 |
| 2007/0063541 A1 * | 3/2007 | Browne | ......... | B62D 35/00 296/180.1 |
| 2008/0284265 A1 * | 11/2008 | Chaohai | ......... | H02K 5/10 310/89 |
| 2009/0295190 A1 * | 12/2009 | Kottenstette | ......... | B62D 35/005 296/180.3 |
| 2010/0140414 A1 * | 6/2010 | Beyer | ......... | B64C 9/22 244/214 |
| 2010/0140976 A1 * | 6/2010 | Browne | ......... | B62D 35/005 296/180.1 |
| 2012/0248257 A1 * | 10/2012 | Eichhorn | ......... | B64C 9/04 244/214 |
| 2012/0330513 A1 * | 12/2012 | Charnesky | ......... | G01S 13/931 701/48 |
| 2014/0076645 A1 * | 3/2014 | McDonald | ......... | B62D 35/005 180/68.1 |
| 2015/0084369 A1 * | 3/2015 | Niemi | ......... | B62D 35/02 296/180.1 |
| 2016/0229467 A1 * | 8/2016 | Miller | ......... | B62D 35/02 |
| 2016/0230820 A1 * | 8/2016 | Matthews | ......... | F16D 43/2024 |
| 2017/0101136 A1 * | 4/2017 | Zielinski | ......... | B62D 35/005 |
| 2017/0106922 A1 * | 4/2017 | Povinelli | ......... | B62D 35/02 |
| 2017/0120968 A1 * | 5/2017 | Povinelli | ......... | B62D 37/02 |
| 2017/0137074 A1 * | 5/2017 | Miller | ......... | B62D 35/005 |
| 2018/0093716 A1 * | 4/2018 | Povinelli | ......... | B62D 35/02 |
| 2019/0106163 A1 * | 4/2019 | Fahland | ......... | B62D 37/02 |

FOREIGN PATENT DOCUMENTS

| | | |
|---|---|---|
| DE | 19509568 C1 | 8/1996 |
| DE | 19945755 A1 | 3/2001 |
| DE | 102004013754 A1 | 10/2005 |
| DE | 102011018445 A1 | 10/2012 |
| EP | 0802348 A2 | 10/1997 |
| EP | 1594212 A2 | 11/2005 |
| EP | 1755923 A1 | 2/2007 |
| EP | 2738087 A2 | 6/2014 |
| GB | 616119 A | 1/1949 |
| JP | S55132343 A | 10/1980 |
| JP | S59156875 A | 9/1984 |
| JP | H01176584 U | 12/1989 |
| JP | H04237686 A | 8/1992 |
| JP | H06298129 A | 10/1994 |

OTHER PUBLICATIONS

International Search Report for Application No. PCT/US2015/035127 dated Jul. 15, 2014.

International Search Report for Application No. PCT/US2015/035084 dated Dec. 3, 2015.

\* cited by examiner

ACTIVE FRONT DEFLECTOR

CROSS-REFERENCE TO RELATED APPLICATIONS

This application is a continuation of U.S. patent application Ser. No. 15/928,853, filed Mar. 22, 2018, which is a continuation of U.S. patent application Ser. No. 15/318,233, filed Dec. 12, 2016, issued as U.S. Pat. No. 9,956,998, which is a National Stage of International Application No. PCT/US2015/035127, filed Jun. 10, 2015, which claims the benefit of U.S. Provisional Patent Application No. 62/010,854, filed Jun. 11, 2014. The disclosures of the above applications are incorporated herein by reference.

FIELD OF THE INVENTION

The present invention relates to a panel structure of an active front deflector system for automotive applications.

BACKGROUND OF THE INVENTION

There is a considerable loss of aerodynamic efficiency in vehicles, in particular, due to the airflow underneath and around a vehicle. Conventional structures, such as fixed panels or fixed air deflectors/dams using flexible materials, are known and do not meet desired requirements. These fixed air deflector/dams are still a compromise as they cannot be made to the optimum height without comprimising specifications and comparisions to other vehicle capabilites. Further, these air dams even when flexible are still damaged during off-roading or when added ground clearance is needed. They also do not have the capability of being placed at multiple positions.

Accordingly, there is a desire for an active front deflector that provides an aerodynamic surface for improved aerodynamic when deployed, but is retractable out of the way under predetermined conditions to return the vehicle to its initial design intent, and which is also capable of reaching multiple positions.

SUMMARY OF THE INVENTION

There is provided an aerodynamic surface which improves aerodynamics when deployed and is retractable out of the way to return the vehicle to its initial design intent, as well as capability of reaching multiple positions depending on the application and different driving situations. The present invention is directed to an active front deflector assembly having a deflector panel that is movable by an actuator attached to a linkage arrangement. The retractable deflector located in the front of the vehicle under the body is capable of changing the vehicle aerodynamics. The deflector redirects the air flow in the front of the vehicle to improve the vehicles aerodynamics for either fuel economy or performance characteristics. The deflector is held in place by two four bar linkages with a specific arrangement and ratio of the links to each other critical to the motion of the deflector.

The active front deflector assembly is retractable so that it does not compromise the vehicle capabilities for conditions such as when added ground clearance is needed, and is deployable for normal driving conditions. When in the extended or deployed position under predetermined conditions, the deflector panel improves airflow. When in the retracted or stowed position, the deflector panel rises out of the air flow.

The active front deflector assembly is held in place by at least two four bar linkage arrangements with specific geometry/ratios of links to one another that are critical to the desired motion of the deflector panel, and will allow them to reach multiple positions for different predetermined driving situations. The deflector panel can be positioned at multiple heights In addition, a drive shaft transmits the drive force from the left side to the right side or vice versa, of the linkage arrangement. The deflector panel is both rigid and semi-rigid to absorb impact energy.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Referring to FIGS. 1-6 generally, in accordance with the present invention, there is provided an active front deflector assembly generally shown at 10, moveable between at least a stowed position (or "retracted" position) and deployed position (or "extended" position) and/or at least one intermediate position, under predetermined conditions. The active front deflector assembly provides an active full air deflector that deploys and retracts based on predetermined vehicle requirements. This allows for a deployment lower than fixed panel systems to significantly reduce drag, reduce emissions, improves fuel economy, (and/or improve active grille shutter performance when used in combination with the active front deflector assembly). Additionally, it allows for the system to retract so the vehicle can still meet ground clearances, ramp angles, off-road requirements, etc. These are significant improvements over typical vehicle systems utilizing a fixed sacrificial panel below and/or near the fascia to achieve basic and less effective aerodynamic improvements.

Figure 1:
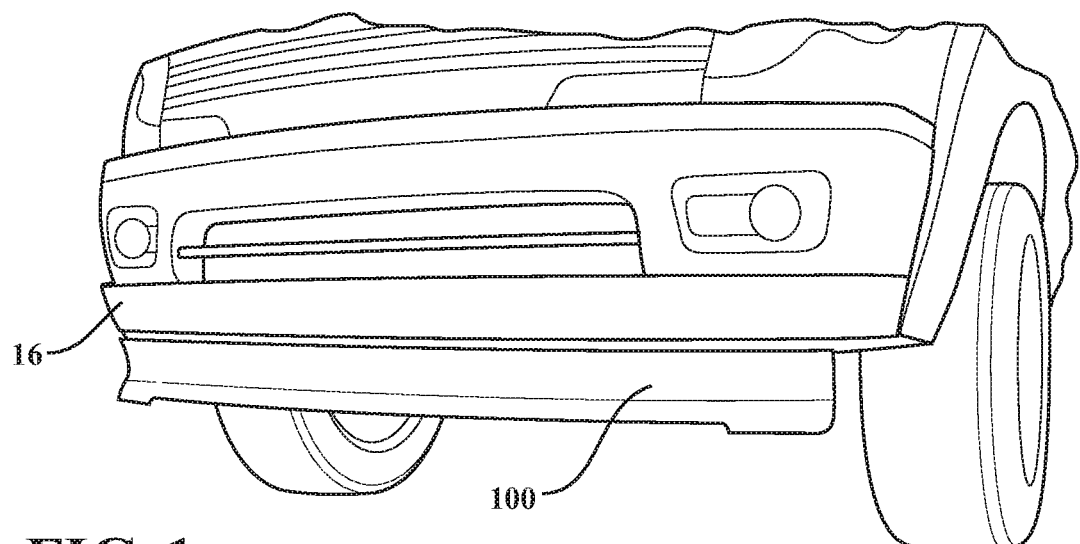
FIG. 1 is a front perspective view a vehicle with an active front deflector assembly in a deployed position, in accordance with the present invention.
Figure 2:
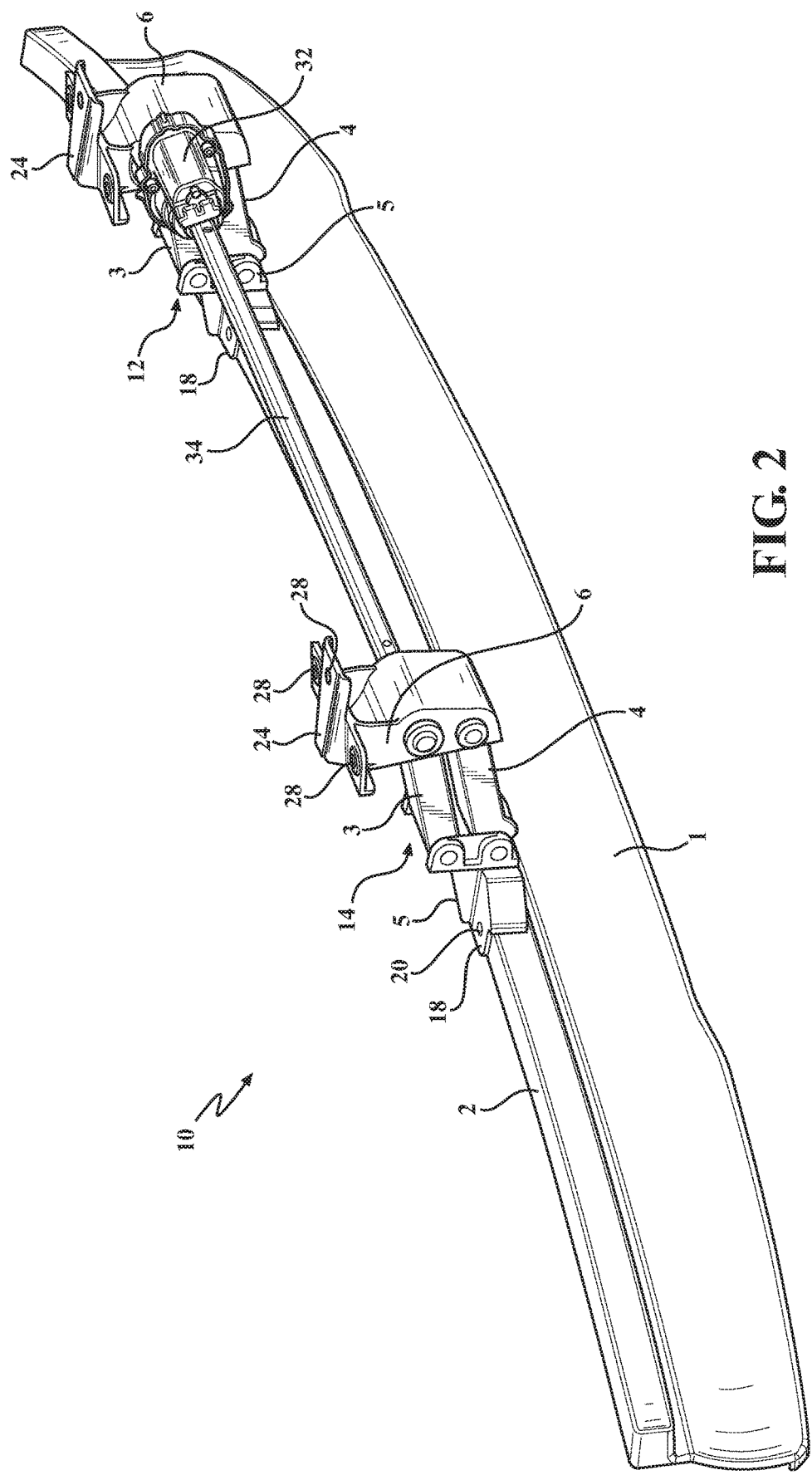
FIG. 2, is a perspective view of an active front deflector assembly in a deployed position, in accordance with the present invention.
Figure 6:
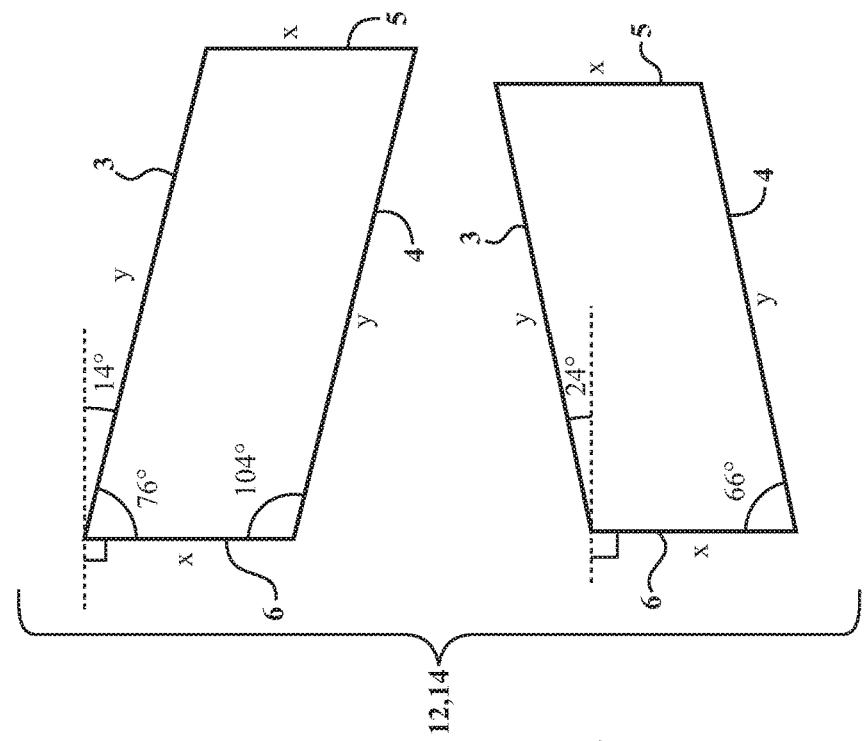
FIG. 6, is a schematic of linkage ratios and geometry of the linkage assemblies of the active front deflector assembly in a deployed position and a retracted position, in accordance with the present invention.
Figure 3:
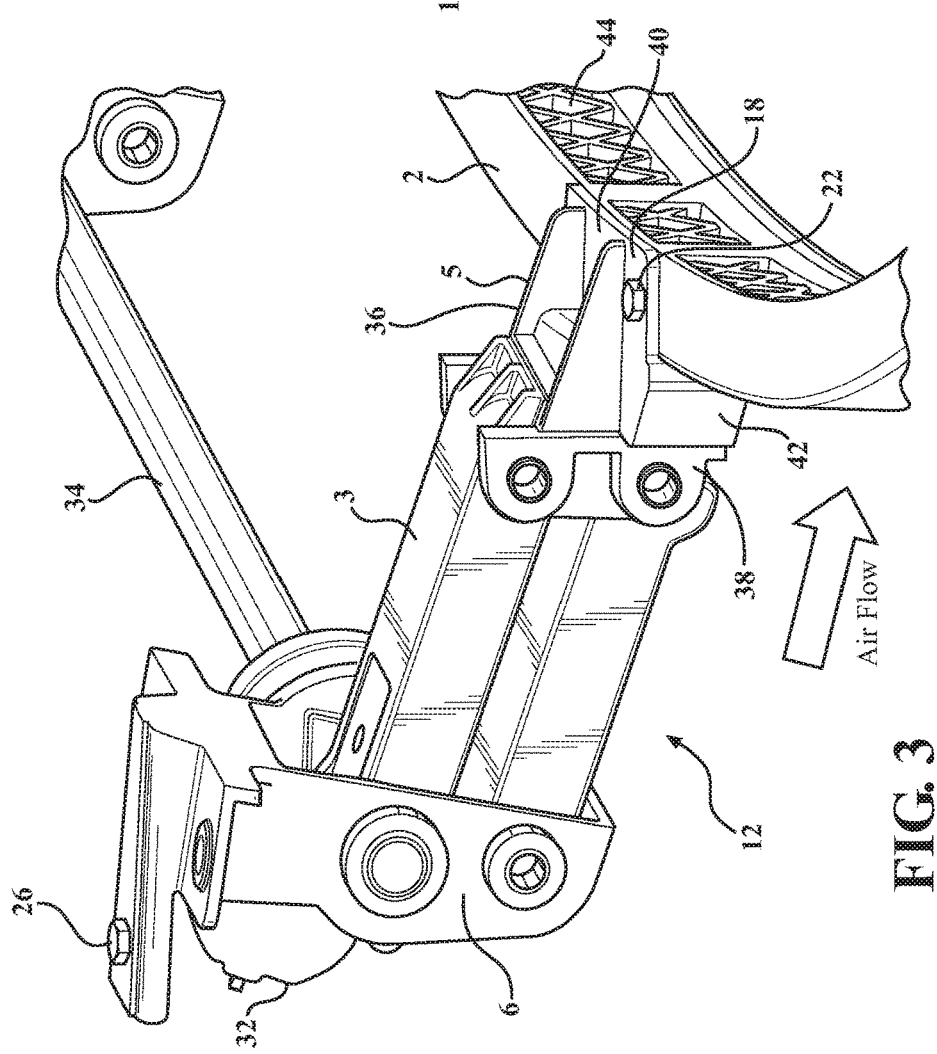
FIG. 3, is an enlarged rear perspective view depicting a linkage assembly of the active front deflector assembly of FIG. 2, in accordance with the present invention.
Figure 4:
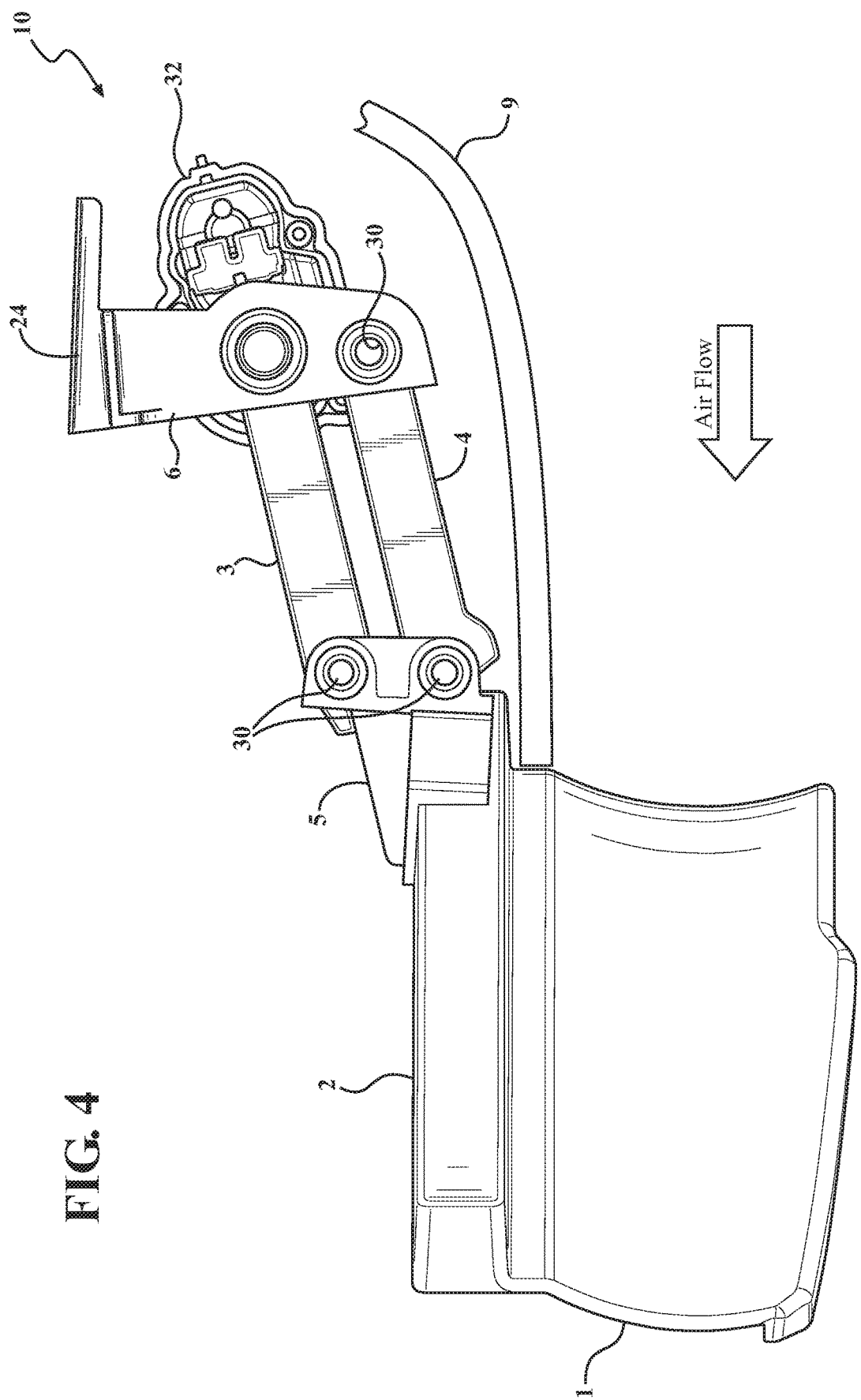
FIG. 4, is an enlarged side elevation view of the deployed active front deflector assembly of FIG. 2, in accordance with the present invention.
Figure 5:
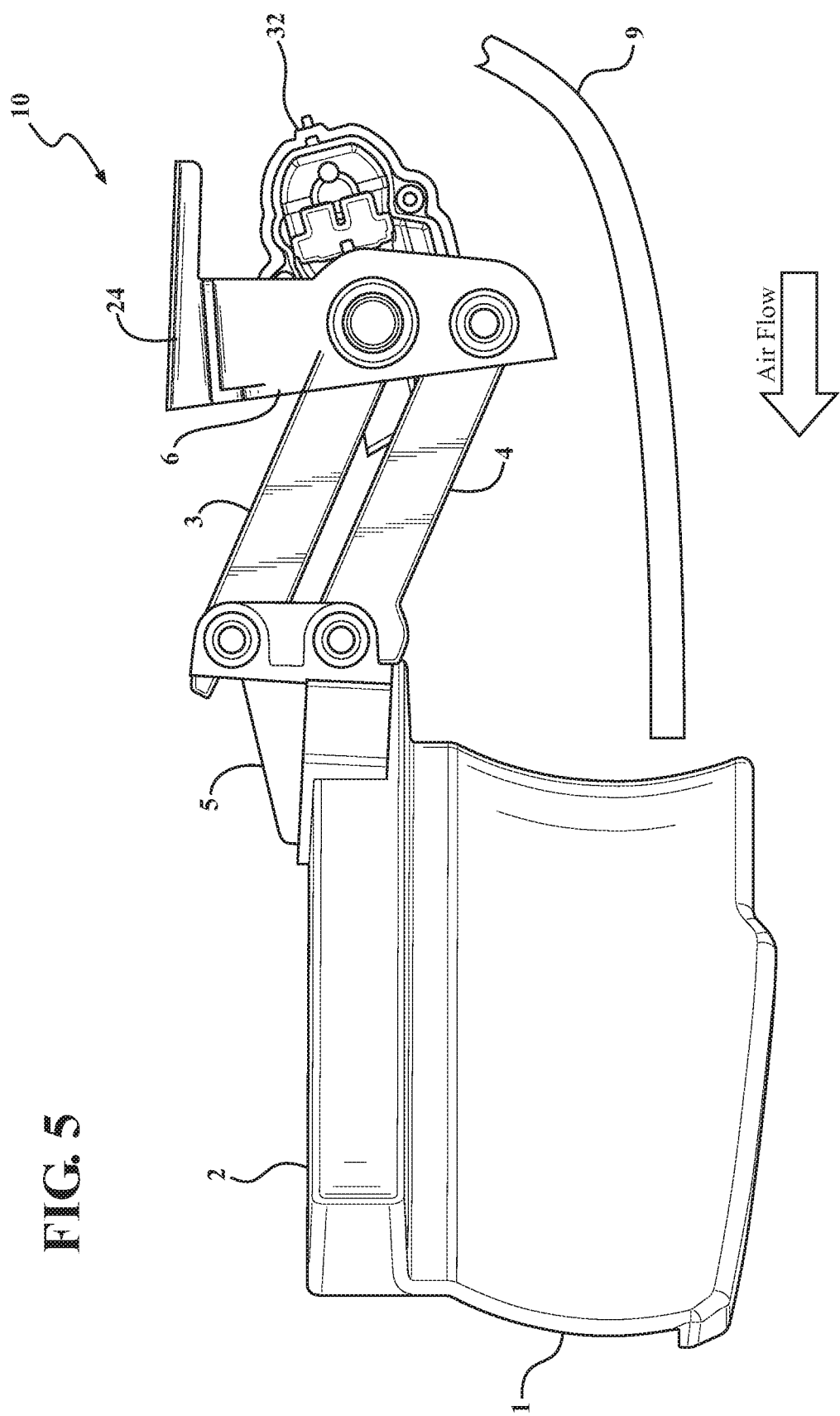
FIG. 5, is an enlarged side elevation view of the active front deflector assembly of FIG. 2 shown in a retracted position, in accordance with the present invention.

FIG. 1 is a perspective view of an active front deflector assembly 100 shown in an environment of use attached to a vehicle 16, in accordance with the present invention. This is typical of the environment and shows the active front deflector assembly 100 in the deployed position, in accordance with the present invention.

Referring to FIGS. 2-6 generally, in accordance with another embodiment of the present invention there is provided an active front deflector assembly generally shown at 10 movable between at least a stowed position and a deployed position under predetermined conditions. The active front deflector assembly 10 generally includes at least one deflector panel 1 that is semi-rigid with a rigid upper spine 2 portion. Most preferably, the semi-rigid and rigid portion are integrally formed. The deflector panel 1 is coupled to at least two linkage assemblies generally shown at 12, 14 that are four bar linkages. The two four bar linkage assemblies 12, 14 are operable spaced apart to provide strength, durability, and installation on the vehicle, while preventing binding and allowing smooth transitioning between the deployed and retracted positions.

Each linkage assembly 12, 14 has a drive link 3 and a follower link 4 pivotally connected to a coupler link 5 and pivotally connected to a fixed base link 6, respectively. The coupler link 5 also includes a mounting portion 18; e.g., an integrally formed mounting bracket with apertures 20 for receiving fasteners 22, to operably couple each of the respective linkage assemblies 12, 14 to the rigid spine 2 of the deflector panel 1. In this embodiment, there are two linkage assemblies 12, 14 used with each active front deflector assembly 10. However, it is within the scope of the invention that more or less linkage assemblies 12, 14 may be used, depending upon the length of the assembly 10 and particular application.

At least one fastener 22 (FIG. 3) is used to connect each of the mounting portions 18 to the rigid portion 2 of the deflector panel 1. At least one pair of sloped webs or fins 36 extend from the coupler link 5 main body 38 and are affixed to, or integrally formed with, the mounting portion 18. e.g., generally L-shaped mounting portion 18 with upper portion 40 attached along the top of the upper spine 2 and lower portion 42 located along the front side of the upper spine 2.

The assembly 10 is operably supported and connected to a fascia portion of the vehicle 16, bumper reinforcement, fenders, frame or any other vehicle structure or molding for securing the linkages of the assembly 10 to the vehicle 16. The assembly 10 is attached to the underside of the vehicle 16 towards the front with at least two attachment brackets 24 connected to or most preferably, integrally formed with the fixed base link 6 of each linkage assembly 12, 14. Each of the linkage assemblies 12, 14 is then attached to the vehicle 16 by at least one fastener 26. Each fastener 26, preferably, at least three, extends through a corresponding one of at least one aperture 28 formed as part of attachment brackets 24. All of the fasteners in this embodiment are nut and bolt combinations, but it is within the scope of the invention that other fasteners, such as rivets, may be used as well.

The coupler link 5 includes at least two pairs of apertures through which two additional fasteners 30 extend, respectively, and each respective fastener 30 also extends through a corresponding end of the drive link 3 and follower link 4. e.g., through a cylindrical-shaped opening formed in the links 3, 4, thereby pivotably connecting the drive link 3 and follower link 4 to the coupler link 5. The fixed base link 6 also has at least one pair of apertures through which an additional fastener extends, which fastener 30 also extends through a corresponding end of the follower link 4, thereby pivotally connecting the follower link 4 to the fixed base link 6.

The coupler link 5, drive link 3, follower link 4, and fixed base link 6 of the two four bar linkage assemblies 12, 14 have predetermined geometry and ratio of links to each other critical to the motion of the deflector panel 1 between at least the deployed and retracted position.

In the deployed position, each of the linkage assemblies 12, 14 form a parallelogram shape, preferably, where both pairs of opposing sides (e.g., first pair "x,x" and second pair "y,y" in FIG. 6) are equal in length and parallel, respectively, and, most preferably, additionally where none of the inside corner angles is 90°. The angle between the fixed base link 6 and drive link 3 in the deployed position is 76 degrees, the linkage assembly 12 and 14 are each a parallelogram, the drive link 3 and follower link 4 are the same length, and the coupler link 5 and fixed base link 6 are the same length as each other. The length of the coupler link 5 and fixed base link 6 is less than the drive link 3 and follower link 4. The angle between the fixed base link 6 and follower link 4 in the deployed position is 104 degrees. In the retracted position, the angle between the fixed base link 6 and follower link 4 is 66 degrees.

The active front deflector assembly 10 is attached to the underside of the vehicle towards the front, e.g., using the at least two attachment brackets 24 provided on the fixed base link 6 and fasteners 26. In the deployed position (generally down) the deflector panel 1 is in the air flow (see FIGS. 3-4); the rigid part 2 is not in the air flow and is protected by the vehicle body 9. The deflector panel 1 interrupts the air flow thereby improving the vehicle aerodynamics. However, this deployed positioning reduces the vehicle ground clearance. When the vehicle needs its full ground clearance capabilities the deflector panel 1 is retracted (generally up) (e.g., see FIG. 5).

At least the drive link 3 and follower link 4 each have strengthening features, e.g., such as generally a U-shape or channel shaped and/or other suitable structure to add strength while minimizing weight, generally along its length from one joint area to the other joint area of the links. The deflector panel 1 preferably has trusses 42 between intermittent vertical walls and/or other suitable structure to add strength while minimizing weight.

One of the linkage assemblies 12, 14 e.g., the left hand four bar linkage 12, also has an actuator 32. The linkage assemblies 12, 14 are connected to the deflector panel 1, 2 and to a drive shaft 34 which is coupled to the actuator 32. The linkage assemblies 12, 14 are joined by the deflector 1, 2 (via coupler link 5 of both linkages 12, 14) and the drive shaft 34. Retraction and deployment of the active front deflector assembly 10 is achieved by the actuator 32.

The actuator 32 is attached to the drive shaft 34 which is attached toward the ends of the drive links 3 of both linkage assemblies 12, 14. The drive shaft 34 also extends through apertures formed in both fixed base links 6 adjacent to corresponding ends of the drive links 3. In operation the actuator 32 rotates the drive shaft 34 which rotates the drive links 3 upward, folding the follower links 4 and coupler links 5 up and causing the deflector panel 1 to rise out of the air flow (FIG. 5) to the retracted position. This motion is achieved with the geometry of the bar linkage assemblies 12, 14 and the ratio of the links to each other (e.g., FIG. 6). For this particular geometry, the motion of the deflector panel 1 is largely vertical which allows for deployment positions in between the end points for use in specific driving conditions.

The actuator 32 rotates the drive shaft 34 in the opposite direction to rotate the drive links 3 downward, causing the follower links 4 and coupler links 5 down and causing the deflector panel 1 to lower into the air flow (e.g., FIG. 4) to the deployed position.

The linkage assemblies 12, 14 and the ratio of the links to each other is critical to the motion of the deflector panel 1 and has significant advantages over conventional systems. The deflector panel 1 can be positioned at multiple heights, which is yet another significant advantage over typical systems. The drive shaft 34 also transmits the drive from the left side to the right side, or vice versa. The deflector 1,2 is both rigid and semi-rigid to absorb impact energy, which is another significant advantage.

The actuator 32 is selected from the group consisting of a rotary actuator e.g., with feedback options, hex-type, screw-type drive, higher speed actuator, electric, mechanical linear, e.g., with current override circuits, declutching hydraulic, pneumatic, extending, power lift actuator, or any other actuator and combinations thereof depending on the application and predetermined vehicle needs. Depending on the application, the actuator 32 is not a clutched actuator Suitable electontronics, preferably a shut off printed circuit board (PCB) with connector contacts correlate with vehicle communication networks for commanding a motor based upon predetermined conditions, e.g., commanding energizing of the motor correlating with predetermined vehicle speed ranges. By way of non-limiting example, the deflector panel 1 is retracted until the vehicle reaches a predetermined speed of 30 miles per hour, then the deflector panel 1 is extended and stays deployed until the vehicle drops back down to below the predetermined speed, e.g., 30 mph, or other predetermined conditions for continued deployment are no longer met. The actuator 32 has communication capability with the vehicle 16. The actuator 32 and the vehicle 16 also communicate to deploy and retract the deflector panel 1 based upon predetermined conditions such as vehicle speed, wind direction yaw, etc, and combinations thereof. By way of non-limiting example, the deflector panel 1 is retracted until the vehicle reaches a predetermined speed of 30 miles per hour then the deflector panel 1 is extended and stays deployed until the vehicle drops back down to below the predetermined speed, e.g., 30 mph, or other predetermined conditions for continued deployment are no longer met.

When the deflector panel 1 is down in the deployed position it is extended generally about one quarter to one half of the distance to the traversed ground surface, preferably, about one third of the distance. Depending on the application, the deflector panel 1 is selectively positioned at a plurality of predetermined heights.

The deflector panel 1 is made of a composite plastic in this particular embodiment. However, it is also within the scope of the invention to manufacture the deflector panel 1 of different materials such as steel or aluminum (depending on the particular application), painted carbon fiber, extruded rubber, or other suitable impact resistant material to withstand a predetermined load without departing from the scope of the invention. Additionally, the deflector panel 1 may consist of a single piece, e.g., of molded composite plastic, or multiple pieces assembled or molded together.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An active front deflector assembly for a vehicle, comprising:
    at least one deflector panel, where the deflector panel selectively deploys and retracts between at least a deployed position and a stowed position, where the deployment of the deflector panel improves aerodynamics;
    at least two linkage assemblies attached to the deflector panel and adapted to attach to the vehicle, each linkage assembly forming a parallelogram of links when in the deployed position, wherein one of the links includes a mounting portion that is L-shaped with an upper portion attached to a top surface of the deflector panel;
    a drive shaft operably coupled to the at least two linkage assemblies wherein the drive shaft transmits the drive from one side of the active front deflector assembly to the other; and
    an actuator operably coupled to the linkage assemblies and drive shaft, where the actuator is in communication with the vehicle and deploys and retracts the deflector panel under predetermined conditions;
    wherein the parallelogram geometry and a ratio of the links to each other allow movement of the deflector panel between at least the deployed and stowed positions.

2. The active front deflector assembly of claim 1, wherein the deflector panel is semi-rigid with a rigid upper spine, to absorb impact energy.

3. The active front deflector assembly of claim 2, wherein when in the deployed position during vehicle movement the rigid upper spine is not in the air flow.

4. The active front deflector assembly of claim 1, wherein the actuator correlates with vehicle communication networks for commanding operation of the actuator based upon predetermined conditions.

5. The active front deflector assembly of claim 4, wherein the predetermined conditions are selected from the group consisting of vehicle speed, wind direction, yaw, and combinations thereof.

6. The active front deflector assembly of claim 5, wherein the predetermined condition for deploying the deflector panel is vehicle speed in the range of at least 30 miles per hour.

7. The active front deflector assembly of claim 1, wherein the predetermined condition for retracting the deflector panel is vehicle speed in the range of less than 30 miles per hour.

8. The active front deflector assembly of claim 1, further comprising a plurality of attachment brackets to attach the at least two linkage assemblies toward the front of the vehicle.

9. The active front deflector assembly of claim 1, wherein the at least two linkage assemblies each further comprise:
    a coupler link, where the coupler link is attached to an upper spine that is rigid of the deflector panel;
    a fixed base link, where the fixed base link is attached to the vehicle;
    a drive link pivotably connected to the coupler link and fixed base link; and
    a follower link pivotably connected to the coupler link and fixed base link.

10. The active front deflector assembly of claim 9, wherein, when in the deployed position, the angle between the fixed base link and drive link in the deployed position is 76 degrees.

11. The active front deflector assembly of claim 9, wherein, when the at least two linkage assemblies are in the retracted position, the angle between the fixed base link and the follower link is 66 degrees.

12. The active front deflector assembly of claim 11, where a first pair of opposing sides of the at least two linkage assemblies are equal in length and parallel and a second pair of opposing sides of the at least two linkage assemblies are equal in length and parallel, where the lengths of the first and second pairs are not the same.

13. The active front deflector assembly of claim 9, wherein the actuator is operably connected to the drive shaft which is attached to the drive links and fixed base links of the at least two linkage assemblies, where rotation of the drive shaft rotates the drive links upward causing the follower and coupler links to fold upward causing the deflector panel to rise out of the air flow to the retracted position, and wherein rotation of the drive shaft in the opposite direction rotates the drive links downward causing the follower and coupler links down and the deflector panel to lower into the air flow to the deployed position.

14. The active front deflector assembly of claim 9, wherein each coupler link has the mounting portion that is L-shaped with an upper portion attached to the top surface of a rigid upper spine portion of the deflector panel with at least two fasteners.

15. The active front deflector assembly of claim 1, further comprising at least one attachment bracket connected to each of the linkage assemblies, wherein the attachment brackets connect the active front assembly to the vehicle using at least one fastener.

16. An active front deflector assembly for a motor vehicle, comprising:
   at least one deflector panel including a semi-rigid portion and a rigid upper spine portion, where the deflector panel selectively deploys and retracts between a deployed position within an air flow, a stowed position out of the air flow, and predetermined partially deployed positions therebetween, where the deployment and partial deployment of the deflector panel improves aerodynamics;
   at least two linkage assemblies attached to the rigid upper spine of the deflector panel and connected to the vehicle, each linkage assembly forming only a parallelogram shape when in the deployed position and when in the retracted position, wherein the angle between a fixed base link and a drive link of each of said at least two linkage assemblies is about 66 to 76 degrees; and
   an actuator;
   a drive shaft operably coupled to the actuator and to the at least two linkage assemblies, where the actuator is in communication with the vehicle and automatically deploys the deployable panel under predetermined conditions and automatically retracts the deployable panel when predetermined conditions for continued deployment are no longer met;
   wherein the predetermined conditions are selected from the group consisting of vehicle speeds, wind directions, yaw, and combinations thereof, and
   wherein the parallelogram geometry and a ratio of the links to each other allow movement of the deflector panel between at least the deployed and retracted positions.

17. The active front deflector assembly of claim 16, wherein the at least two linkage assemblies each further comprise:
   a coupler link, where the coupler link is attached to the upper spine of the deflector panel;
   the fixed base link, where the fixed base link is adapted to the vehicle;
   the drive link pivotably connected to the coupler link and fixed base link; and
   a follower link pivotably connected to the coupler link and fixed base link.

18. The active front deflector assembly of claim 17, wherein, when in the deployed position, the angle between the fixed base link and drive link in the deployed position is 76 degrees, and, when the at least two linkage assemblies are in the retracted position, the angle between the fixed base link and the follower link is 66 degrees.

19. The active front deflector assembly of claim 18, where a first pair of opposing sides of the at least two linkage assemblies are equal in length and parallel and a second pair of opposing sides of the at least two linkage assemblies are equal in length and parallel, where the lengths of the first and second pairs are not the same.

* * * * *